April 8, 1969  L. J. BISHOP  3,437,054
POWER AND FREE CONVEYOR SYSTEM
Filed Oct. 20, 1966  Sheet 1 of 2
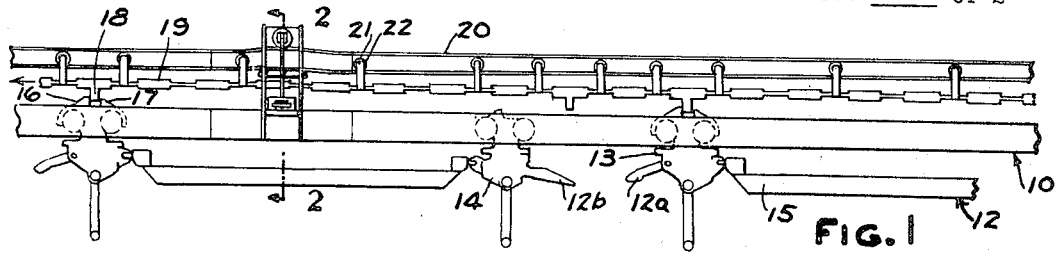
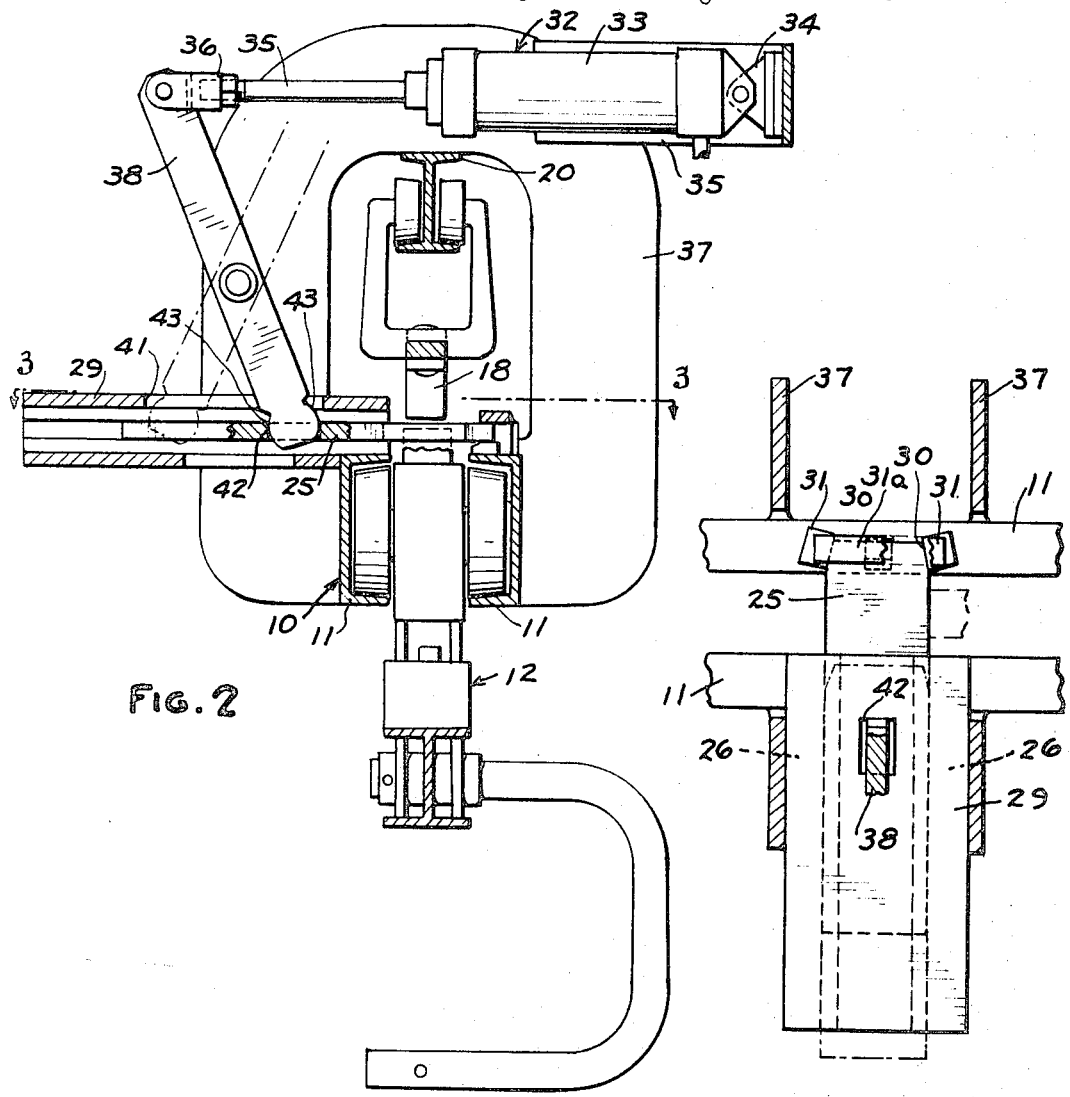
INVENTOR.
LEONARD J. BISHOP
BY
Barnes, Kisselle, Raisch & Choate
ATTORNEYS INVENTOR.
LEONARD J. BISHOP
BY
Barnes, Kisselle, Raisch & Choate
ATTORNEYS United States Patent Office 3,437,054
Patented Apr. 8, 1969

3,437,054
POWER AND FREE CONVEYOR SYSTEM
Leonard J. Bishop, Birmingham, Mich., assignor to
Mechanical Handling Systems, Inc., Warren, Mich.,
a corporation of Michigan
Filed Oct. 20, 1966, Ser. No. 588,175
Int. Cl. B61b 3/00; B61k 1/00
U.S. Cl. 104—178                                      15 Claims

ABSTRACT OF THE DISCLOSURE

A power and free conveyor system comprising a track and a conveyor for moving a plurality of carriers along the track. Each carrier has a depressible pusher dog adapted to be engaged by a pusher on the conveyor. A stop member is supported for movement transversely of the track in a straight line into and out of the path of the depressible dog. A fluid motor has its piston rod mounted for movement generally parallel to the movement of the stop member. A lever arm is pivoted intermediate its ends and has one end thereof pivoted to the piston rod of the motor and the other end thereof pivoted to the stop member.

---

This invention relates to power and free conveyor systems and particularly to a stop mechanism for interrupting the movement of carriers along a track in a power and free conveyor system.

In a power and free conveyor system, it is conventional to provide a track along which carriers are moved by engagement of a pusher on a conveyor with depressible dogs on the carriers. When it is desired to stop the carrier, the depressible dog is depressed by a stop mechanism so that the pusher of the conveyor cannot move the carrier or so that the carrier cannot coast freely along the track.

Among the objects of the present invention are to provide a stop mechanism for power and free conveyor systems which is compact, has a limited number of parts, is easily assembled and does not interfere with the surroundings.

In the drawings:

FIG. 1 is a partly diagrammatic side elevational view of a power and free conveyor system embodying the invention.

FIG. 2 is a fragmentary sectional view on an enlarged scale taken along the line 2—2 in FIG. 1.

FIG. 3 is a fragmentary sectional view taken along the line 3—3 in FIG. 2.

Figure 4:
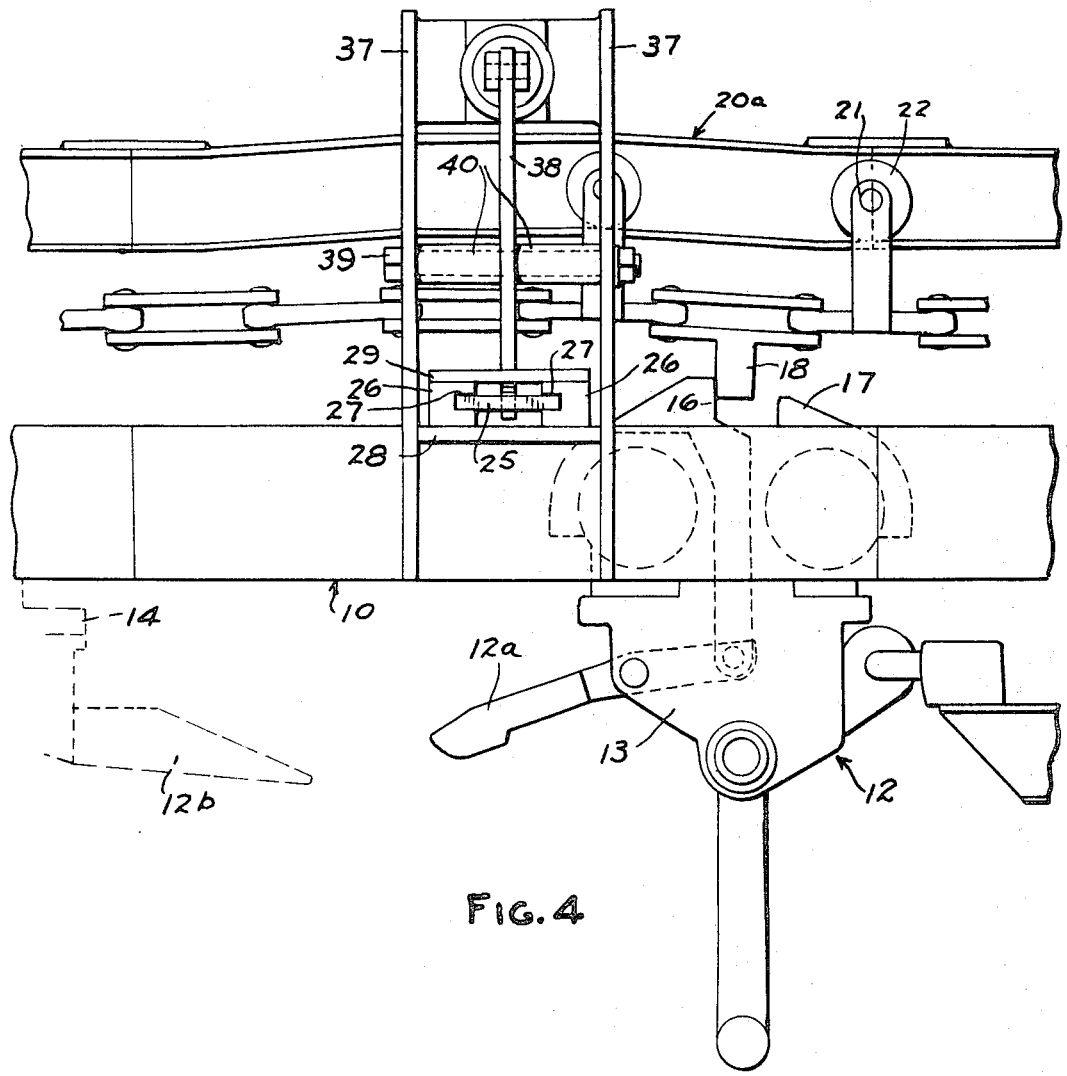
FIG. 4 is a fragmentary side elevational view on an enlarged scale of a portion of the system shown in FIG. 1.

Referring to FIG. 1, a power and free conveyor system conventionally comprises a main track 10 that is composed of inwardly facing channels 11 (FIG. 2) along which the wheels of carriers 12 are free to move. Each carrier 12 may comprise one or more trolleys 13, 14 and an interconnecting tie bar 15, if more than one trolley is used. At least one of the trolleys includes a depressible pusher dog 16 and a hold back dog 17. A pusher 18 on a chain 19 is adapted to engage the pusher dog 16 and move the carrier 12 along the track 10. Chain 19 is supported for movement by a chain track 20 which comprises an I-beam along which chain trolleys 21 having rollers thereon ride (FIG. 2). Each carrier is provided with a movable bumper 12a that is adapted to engage a fixed bumper 12b on the rear of the preceding carrier to lower the depressible dog 16 and thereby accumulate the carriers in case the preceding carrier is stopped.

In accordance with the invention, a stop plate or slide 25 is mounted adjacent the upper portion of the track 10 for movement transversely into and out of the path of the pusher dog 16 to depress the pusher dog so that the pusher 18 will not engage the pusher dog 16.

Plate 25 is guided in its movements by guide blocks 26 of low friction material such as brass that have guideways 27 therein into which the sides of stop plate 25 extend. Guide blocks 26 are mounted on a bottom plate 28 and held in fixed relation by a top plate 29. The end of stop plate 25 is beveled as at 30 and is adapted to engage stops 31 on one of the track channels 11. A cross bar 31a extends across stops 31 above the free end of the stop plate 25 to prevent any upward movement of the stop plate. The stop plate 25 is thus firmly held by the guide blocks 26 and the pocket formed by the channel 11, stops 31 and cross bar 31a.

Stop plate 25 is moved into and out of the path of the pusher dog 16 by an arrangement which includes a fluid motor 32 that has a cylinder 33 which is pivoted to a bracket 34 supported, in turn, on plate 35 that extends between yoke plates 37 which interconnect the track 10 and the chain track 20.

Fluid motor 32 has a piston rod 35 that extends generally horizontally and is pivoted by a clevis 36 to the upper end of a lever arm 38. The lever arm 38 is pivoted intermediate its ends to the yoke plates 37 by a bolt 39 that extends through integral hubs 40 which give stability to the lever 38 (FIG. 4). The lower end of lever 38 extends downwardly through an opening 41 in top plate 29 and engages the end of an elongated slot 42 in the stop plate 25. The lower end of lever 38 is formed with arcuate surfaces 43 to prevent binding and provide a bearing between the lower end of the lever arm 38 and the plate 25. A pivotal connection is thereby provided between the lower end of the lever arm 38 and the stop plate 25.

It can be readily understood that by applying fluid to the ends of the fluid motor, the lever arm may be pivoted and, in turn, the stop plate 25 reciprocated into and out of the path of the depressible pusher dog 16.

Figure 5:
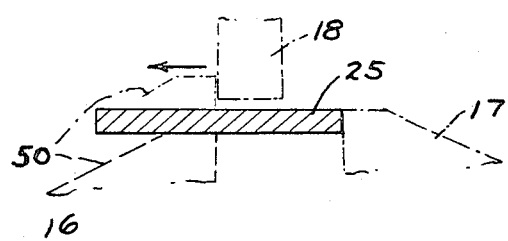
FIG. 5 is a partly diagrammatic longitudinal sectional view showing the manner in which the stop mechanism operates.

The manner in which the plate 25 operates can be more readily understood by reference to FIG. 5. When it is desired to stop a carrier along the track, the stop plate 25 is moved into the path of the pusher dog 16. As a succeeding carrier approaches the stop plate 75, the beveled edge 50 of the pusher dog causes the pusher dog 16 to be cammed downwardly from the upper dotted position to the lower dotted position. The hold back dog 17 engages the stop plate 25 to prevent further movement of the carrier along the track. In this position, the pusher 18 cannot engage the pusher dog 16.

In order to facilitate and ensure the stoppage of the carrier and clearance between the pusher dog 16 and the hold back dog 17, it is preferred that the chain track 20 be spaced vertically a slightly greater distance from the track 11 in the area of the stop as shown more clearly in FIG. 4.

By providing the cylinder so that it operates transversely substantially within the confines of the yoke 37 and in overlying parallel relationship to the stop plate 25, a compact arrangement is achieved which minimizes any lateral projections so that the area around the conveyor sysem is free and unobstructed.

The stop assembly is thus rigidly supported by the track of the power and free conveyor. The stop plate 25 is moved in a straight line and is securely and rigidly held in its stop position at one end by the guide blocks 26 and at the other end by the pocket formed by the stops 31, track 11 and cross plate 31a.

I claim:

1. In a power and free conveyor system, the combination comprising
   a track,
   at least one carrier movable along said track,
   a conveyor,
   said carrier having a depressible pusher dog adapted to be engaged by a pusher on said conveyor,
   a stop member,
   means for supporting said stop member for movement transversely of said track in a straight line into and out of the path of said depressible dog,
   a fluid motor having a cylinder and a piston rod mounted for movement generally parallel to the movement of said stop member,
   a lever arm pivoted intermediate its ends,
   one end of said arm being connected to said piston rod and the other end of said arm being pivotally connected to said stop member whereby when said piston rod is moved relative said cylinder, said stop member is caused to reciprocate into and out of the path of the depressible dog.

2. The combination set forth in claim 1 wherein said stop member comprises a plate,
   a stop on said track,
   the free end of said plate being adapted to move against said stop along said track.

3. The combination set forth in claim 1 wherein said stop member includes an opening therein,
   the lower end of said arm extending into said opening and thereby being pivoted to said stop member.

4. The combination set forth in claim 3 wherein the lower end of said lever arm is provided with arcuate surfaces engaging the ends of said slot.

5. The combination set forth in claim 1 including means pivoting said cylinder to a point fixed with respect to said track.

6. The combination set forth in claim 1 wherein said track comprises inwardly facing channels,
   said carrier having wheels engaging said track.

7. The combination set forth in claim 1 wherein said cylinder generally overlies said stop member.

8. In a power and free conveyor system, the combination comprising
   a main track,
   at least one carrier movable along said main track,
   a conveyor,
   a conveyor track,
   said carrier having a depressible pusher dog adapted to be engaged by a pusher on said conveyor,
   a pair of spaced yoke plates joining said tracks,
   a stop member,
   means for supporting said stop member between said yoke plates for movement transversely in a straight line over said main track into and out of the path of said depressible dog,
   a fluid motor having a cylinder and a piston rod mounted for movement generally parallel to and overlying said stop member,
   means for pivoting said cylinder between said yoke plates,
   a lever arm pivoted intermediate its end between said yoke plates,
   one end of said arm being connected to said piston rod and the other end of said arm being pivotally connected to said stop member whereby when said piston rod is moved relative said cylinder, said stop member is caused to reciprocate into and out of the path of the depressible dog.

9. The combination set forth in claim 8 wherein said stop member comprises a plate,
   stops on said main track,
   the free end of said plate being adapted to move against said stops along said main track.

10. The combination set forth in claim 8 wherein said stop member includes an opening therein,
    the lower end of said arm extending into said opening and thereby being pivoted to said stop member.

11. The combination set forth in claim 10 wherein the lower end of said arm is provided with arcuate surfaces engaging the ends of said slot.

12. The combinations set forth in claim 8 wherein said track comprises inwardly facing channels,
    said carrier having wheels engaging said track.

13. In a power and free conveyor system, the combination comprising
    a main track,
    at least one carrier movable along said main track,
    a conveyor,
    said carrier having a depressible pusher dog adatped to be engaged by a pusher on said conveyor,
    a stop plate,
    guide blocks on said main track for guiding the movement of said stop member transversely of said main track in a straight line,
    stop members defining a pocket on said main track adapted to be engaged by said stop plate when said stop plate is moved transversely of said main track into position for depressing said dog of said carrier,
    and means for moving said stop plate transversely of said main track.

14. The combination set forth in claim 13 including
    a conveyor track,
    a pair of spaced yoke plates joining the main track and conveyor track,
    said means for moving said stop plate transversely of said track comprising a fluid motor having a cylinder and a piston rod mounted for movement generally parallel to and overlying said stop plate,
    means for pivoting said cylinder between said yoke plates,
    a lever arm pivoted intermediate its ends between said yoke plates,
    one end of said arm being connected to said piston rod and the other end of said arm being connected to said stop plate whereby when said piston rod is moved relative to said cylinder, said stop plate is caused to reciprocate into and out of the path of the depressible dog.

15. The combination set forth in claim 13 wherein said main track comprises spaced channel members,
    said guide blocks being mounted on one of said channel members and said pocket defining means being mounted on the other of said channel members.

References Cited

UNITED STATES PATENTS 3,229,645  1/1966  Dehne _____ 104—172
3,347,171  10/1967  Torrance _____ 104—250 X ARTHUR L. LAPOINT, *Primary Examiner.*

DANIEL F. WORTH III, *Assistant Examiner.*

U.S. Cl. X.R.

104—249